(12) United States Patent
Blinzer et al.

(10) Patent No.: US 12,380,034 B2
(45) Date of Patent: Aug. 5, 2025

(54) EXTENDED ATTRIBUTES FOR SHARED PAGE TABLES

(71) Applicants: Advanced Micro Devices, Inc, Santa Clara, CA (US); ATI Technologies ULC, Markham (CA)

(72) Inventors: Paul Blinzer, Carnation, WA (US); Anthony Asaro, Toronto (CA); Nippon HarshadKumar Raval, Mississauga (CA); Anthony Thomas Gutierrez, Seattle, WA (US); Leopold Grinberg, Belmont, MA (US); Millind Mittal, Saratoga, CA (US); Samuel Richard Bayliss, Los Altos, CA (US)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 18/217,291

(22) Filed: Jun. 30, 2023

(65) Prior Publication Data

US 2025/0004949 A1 Jan. 2, 2025

(51) Int. Cl.
*G06F 12/10* (2016.01)
*G06F 12/1009* (2016.01)
*G06F 12/14* (2006.01)

(52) U.S. Cl.
CPC ...... *G06F 12/1009* (2013.01); *G06F 12/1416* (2013.01)

(58) Field of Classification Search
CPC ...... G06F 12/10; G06F 12/14; G06F 12/1416; G06F 12/1009
See application file for complete search history.

(56) References Cited

U.S. PATENT DOCUMENTS 11,954,026 B1 * 4/2024 Kaplan ............... G06F 12/1009
2008/0270741 A1 * 10/2008 Tremaine ............... G06F 12/10
711/E12.001

(Continued)

FOREIGN PATENT DOCUMENTS

WO WO-2007146970 A2 * 12/2007 ........... G06F 12/121
WO WO-2008022162 A2 * 2/2008 ........ G06F 12/0607
WO WO-2018048582 A1 * 3/2018 ........ G06F 12/1009

OTHER PUBLICATIONS

J. Y. Hur, "Contiguity Representation in Page Table for Memory Management Units," in IEEE Transactions on Very Large Scale Integration (VLSI) Systems, vol. 27, No. 1, pp. 147-158, Jan. 2019.*
Y. Hao, Z. Fang, G. Reinman and J. Cong, "Supporting Address Translation for Accelerator-Centric Architectures," 2017 IEEE International Symposium on High Performance Computer Architecture (HPCA), Austin, TX, USA, 2017, pp. 37-48.*

(Continued)

*Primary Examiner* — Pierre Michel Bataille
(74) *Attorney, Agent, or Firm* — FIG. 1 Patents

(57) ABSTRACT

In accordance with the described techniques for extended attributes for shared page tables, a device includes an accelerator device and a memory management unit that maintains a first set of page tables and a second set of page tables. The second set of page tables includes extended attributes for accessing data that the accelerator device operates on. The memory management unit is configured to receive a virtual memory address, and translate the virtual memory address to a physical memory address using the first set of page tables. In addition, the memory management unit retrieves the extended attributes from the second set of page tables. In this way, data is accessed from the physical memory address based on the extended attributes.

20 Claims, 4 Drawing Sheets

(56) References Cited

U.S. PATENT DOCUMENTS

| | | | |
|---|---|---|---|
| 2010/0191917 A1* | 7/2010 | Archer | G06F 12/0864 |
| | | | 711/135 |
| 2011/0161620 A1* | 6/2011 | Kaminski | G06F 12/1081 |
| | | | 711/E12.001 |
| 2018/0114013 A1* | 4/2018 | Sood | G06F 21/606 |
| 2018/0157601 A1* | 6/2018 | Bryant | G06F 12/12 |
| 2018/0314589 A1* | 11/2018 | Arimilli | G06F 13/1673 |
| 2020/0310993 A1* | 10/2020 | Kumar | G06F 3/0604 |
| 2021/0089478 A1* | 3/2021 | Takeda | G06F 12/1009 |
| 2022/0334978 A1* | 10/2022 | Smith | G06F 12/1009 |
| 2024/0330198 A1* | 10/2024 | Jayasena | G06F 12/1009 |

OTHER PUBLICATIONS

"AMD I/O Virtualization Technology (IOMMU) Specification", Advanced Micro Devices Inc. [retrieved Apr. 20, 2023]. Retrieved from the Internet <https://www.amd.com/system/files/TechDocs/48882_3.07_PUB.pdf>., Jan. 2020, 278 Pages.

"Intel Virtualization Technology for Directed I/O", Intel, Architecture Specification [retrieved Apr. 20, 2023]. Retrieved from the Internet <https://cdrdv2-public.intel.com/671081/vt-directed-io-spec.pdf>., 326 Pages.

"System Memory Management Unit Architecture Specification", Arm Developer, SMMU architecture version 3 [retrieved Apr. 20, 2023]. Retrieved from the Internet <https://developer.arm.com/documentation/ihi0070/latest>., 717 Pages.

* cited by examiner

EXTENDED ATTRIBUTES FOR SHARED PAGE TABLES

BACKGROUND

Virtual memory is a technique to manage the use of shared physical memory. Virtual memory supports a variety of different functionality. Examples of this functionality include expansion of an amount of storage made available to applications beyond that which is actually available in the physical memory, offload memory management from applications and operating systems, use of a variety of different types of memory without the applications being made aware, support memory optimization, address memory fragmentation, and so forth. To do so, virtual memory is conventionally managed via page tables which facilitate translation between virtual memory addresses and physical memory addresses, and retrieval of accessibility attributes relating to a corresponding physical memory address. Conventional page table formats, however, encounter challenges expressing accessibility attributes relating to accelerator devices, which hinders computational efficiency of devices that use these page table formats.

DETAILED DESCRIPTION

Overview

Figure 1:
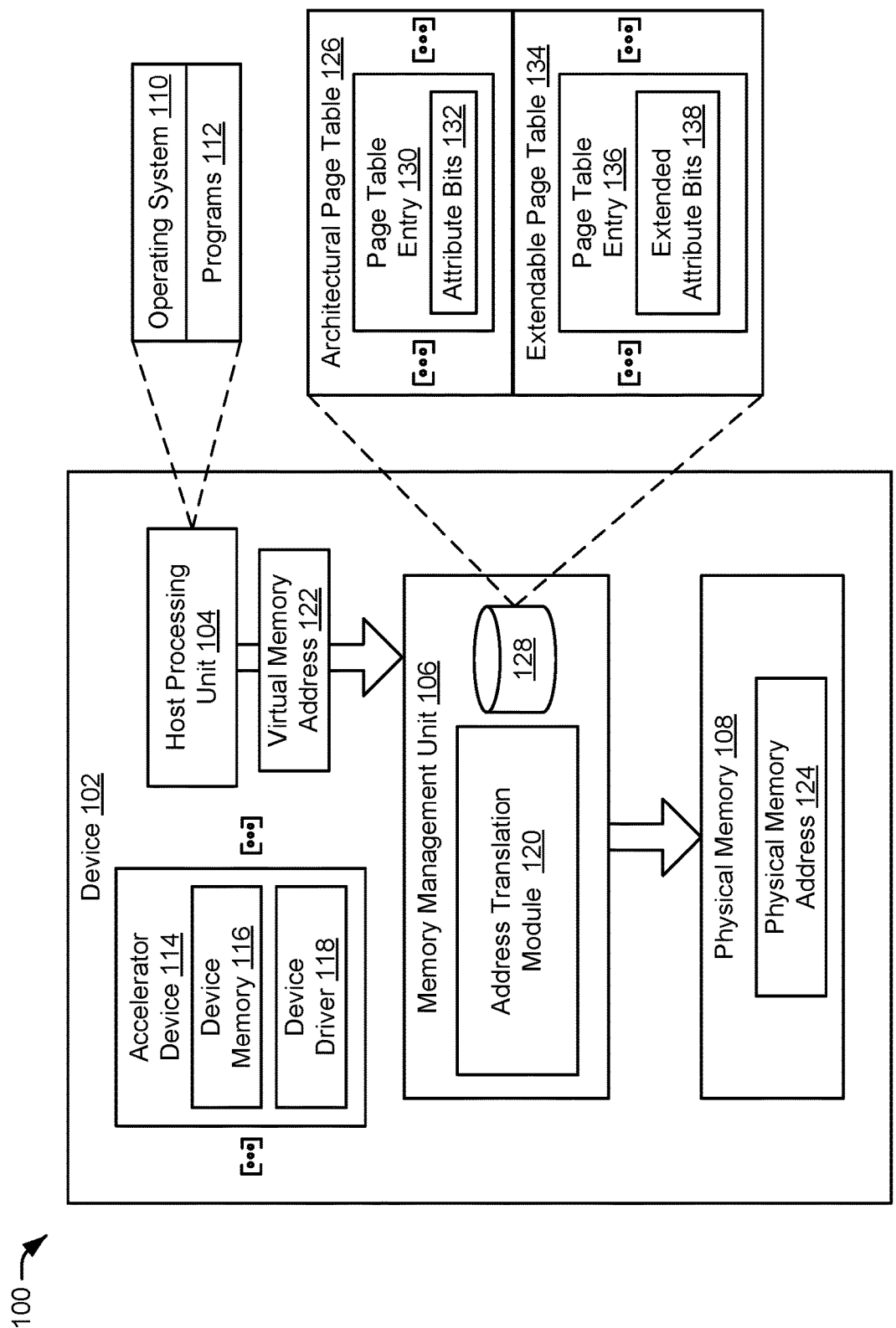
FIG. 1 is a block diagram of a non-limiting example system to implement techniques for extended attributes for shared page tables.

A system includes a host processing unit that is communicatively coupled to a memory management unit that is communicatively coupled to a physical memory. In addition, the device includes one or more accelerator devices communicatively coupled to the host processing unit. In one or more implementations, the host processing unit and/or an accelerator device requests to access data of a virtual memory address. Generally, the system is configured to support virtual-to-physical address translation and accessibility attribute retrieval using one or more sets of page tables, which enables retrieval of data from a corresponding physical memory address in accordance with retrieved accessibility attributes.

To support extended accessibility attributes relevant to accelerator devices, conventional techniques often implement a separate page table system in which each respective accelerator device includes a memory management unit that maintains a set of page tables specific to the respective accelerator device, e.g., per-accelerator page tables. Notably, different accelerator devices have different page table formats, and the different page table formats include bits for specifying different extended attributes associated with respective accelerator devices. Given this, address translation tasks and attribute retrieval tasks are often performed via logic implemented in memory management units of respective accelerator devices and using the per-accelerator page tables.

This design improves accelerator performance based on the accelerator-specific extended attributes that are specifiable by the per-accelerator page tables. However, since each accelerator device separately maintains a mapping of the virtual address space to the physical address space, a modification to a respective one of the mappings is duplicated for each additional accelerator device that operates on data of the modified mapping. This hinders performance of the system as a result of inefficient consumption of communication bandwidth and increased memory management overhead to duplicate mapping modification operations.

To solve these problems, the memory management unit of the host processing unit maintains two sets of shared page tables, namely architectural page tables and extendable page tables. The architectural page tables include page table entries that are architecturally defined by a computing architecture utilized by core hardware components of the device, e.g., the host processing unit and the memory management unit. This architectural definition, for instance, includes a fixed page table entry format in which a particular set of attributes are expressible by a fixed number of bits in the page table entries. Further, the page table entries in the architectural page tables are mapped to pages of physical memory.

In contrast, the extendable page tables have a flexible page table entry format configured for specifying extended attributes relevant to accelerator devices. By way of example, a default format is defined for a plurality of extendable page tables that are associated with a program, e.g., of an application. The default format includes default bits for specifying extended attributes that are generally applicable to accelerator devices, e.g., MTYPE access statuses. Further, the default format is modifiable to include additional bits for specifying extended attributes (e.g., accessibility attributes and cacheability attributes) that are specific to a particular accelerator device invoked by a process of the program.

Given this, the memory management unit receives a virtual memory address from the host processing unit. In response, the memory management unit leverages the architectural page table to translate the virtual memory address into a physical memory address, and to retrieve the architecturally defined accessibility attributes. Moreover, the memory management unit leverages the extendable page table to retrieve the extended attributes. In this way, the host processing unit accesses data from the physical memory address in accordance with the architecturally defined accessibility attributes and the extended attributes, including accessibility attributes that are specific to an accelerator device that operates on the data.

Accordingly, the described techniques enable retrieval of extended attributes relevant to accelerator devices without maintaining separate mappings of the virtual address space to the physical address space at the accelerator devices. By doing so, the mapping of the virtual address space (e.g., maintained by the memory management unit) is modifiable without duplicating mapping modification operations at multiple accelerator devices. Therefore, the described techniques improve device performance over conventional techniques by reducing consumption of communication bandwidth and reducing memory management overhead, while retaining accelerator performance benefits enabled by the extended attributes.

In some aspects, the techniques described herein relate to a device, comprising an accelerator device, and a memory management unit to maintain a first set of page tables and a second set of page tables, the second set of page tables including extended attributes for accessing data that the accelerator device operates on, receive a virtual memory address, retrieve, from the first set of page tables, a physical memory address corresponding to the virtual memory address, and retrieve, from the second set of page tables, the extended attributes, wherein data is accessed from the physical memory address based on the extended attributes.

In some aspects, the techniques described herein relate to a device, wherein a format of the first set of page tables is defined by a computing architecture of the device, the format defining a particular set of accessibility attributes that are specified by attribute bits of page table entries in the first set of page tables.

In some aspects, the techniques described herein relate to a device, wherein the memory management unit is configured to retrieve, from the attribute bits of a page table entry associated with the virtual memory address in the first set of page tables, the particular set of accessibility attributes.

In some aspects, the techniques described herein relate to a device further comprising a host processing unit, wherein the host processing unit is configured to access the data from the physical memory address based on the particular set of accessibility attributes and the extended attributes.

In some aspects, the techniques described herein relate to a device, wherein the second set of page tables include one or more page tables associated with a program, and a default format is defined for the one or more page tables.

In some aspects, the techniques described herein relate to a device, wherein the default format includes default bits for page table entries of the one or more page tables, the default bits specifying default accessibility attributes relevant to accelerator devices.

In some aspects, the techniques described herein relate to a device, wherein a range of virtual memory addresses is allocated to a process of the program, and the one or more page tables include a page table associated with the process.

In some aspects, the techniques described herein relate to a device, wherein the page table entries of the page table are extended to include additional bits based on the accelerator device being invoked by the process, the additional bits specifying accessibility attributes associated with the accelerator device.

In some aspects, the techniques described herein relate to a device, wherein the memory management unit is configured to retrieve the extended attributes from the default bits and from the additional bits of a page table entry associated with the virtual memory address in the page table based on the virtual memory address being within the range.

In some aspects, the techniques described herein relate to a device, wherein the second set of page tables include a first page table identified by a first range of virtual memory addresses allocated to a first process of a program, and a second page table identified by a second range of virtual memory addresses allocated to a second process of the program In some aspects, the techniques described herein relate to a device further comprising an additional accelerator device, the extended attributes of the first page table including accessibility attributes associated with the accelerator device based on the accelerator device being invoked by the first process, and the extended attributes of the second page table including accessibility attributes associated with the additional accelerator device based on the additional accelerator device being invoked by the second process.

In some aspects, the techniques described herein relate to a device, wherein the first set of page tables includes a mapping of the virtual memory address to the physical memory address, and the mapping is modifiable without a device driver of the accelerator device being called.

In some aspects, the techniques described herein relate to a method, comprising receiving, from a processing unit, a virtual memory address, translating the virtual memory address to a physical memory address using a first page table, retrieving extended attributes from a page table entry of a second page table, the page table entry being extended from a default format to include additional bits specifying the extended attributes, and communicating, to the processing unit, the physical memory address and the extended attributes, thereby causing the processing unit to access data from the physical memory address based on the extended attributes.

In some aspects, the techniques described herein relate to a method, wherein the default format includes default bits specifying default accessibility attributes relevant to accelerator devices.

In some aspects, the techniques described herein relate to a method, wherein retrieving the extended attributes includes retrieving the default accessibility attributes from the default bits, and retrieving additional accessibility attributes from the additional bits.

In some aspects, the techniques described herein relate to a method, further comprising retrieving at least one accessibility attribute from the first page table, the communicating including communicating the at least one accessibility attribute to the processing unit, thereby causing the processing unit to access the data from the physical memory address based on the at least one accessibility attribute and the extended attributes.

In some aspects, the techniques described herein relate to a method, wherein a virtual memory address range is allocated to a process of a program, the first page table including a mapping of the virtual memory address range to physical memory addresses.

In some aspects, the techniques described herein relate to a method, wherein the second page table includes an additional mapping of the virtual memory address range to the extended attributes, the extended attributes including accessibility attributes of an accelerator device invoked by the process.

In some aspects, the techniques described herein relate to a method, wherein the mapping is modifiable without a device driver of the accelerator device being called.

In some aspects, the techniques described herein relate to an apparatus, comprising an accelerator device, and a memory management unit to maintain a first page table and a second page table associated with a process of a program, the second page table having a page table entry format that is extendable to include accessibility attributes associated with the accelerator device when the accelerator device is invoked by the process, receive a virtual memory address, translate the virtual memory address to a physical memory address using the first page table, and retrieve the accessibility attributes from the second page table, wherein data is accessed from the physical memory address based on the accessibility attributes.

FIG. 1 is a block diagram of a non-limiting example system 100 to implement techniques for extended attributes for shared page tables. These techniques are usable by a wide range of device 102 configurations. Examples of those devices include, by way of example and not limitation, computing devices, servers, mobile devices (e.g., wearables, mobile phones, tablets, laptops), processors (e.g., graphics processing units, central processing units, and accelerators), digital signal processors, inference accelerators, disk array controllers, hard disk drive host adapters, memory cards, solid-state drives, wireless communications hardware connections, Ethernet hardware connections, switches, bridges, network interface controllers, and other apparatus configurations. Additional examples include artificial intelligence training accelerators, cryptography and compression accelerators, network packet processors, and video coders and decoders. It is to be appreciated that in various implementations, the techniques described herein are usable using any one or more of those devices listed just above and/or a variety of other devices without departing from the spirit or scope of the described techniques.

The illustrated example of the device 102 includes a host processing unit 104 that is communicatively coupled (e.g., via a bus) to a memory management unit 106 that is communicatively coupled (e.g., via a bus) to physical memory 108. The host processing unit 104 is an electronic circuit that performs various operations on and/or using data in the physical memory 108. The host processing unit 104 is configurable in a variety of ways, e.g., as a central processing unit to execute an operating system 110, programs 112 (of applications), and so forth. Other configurations for the host processing unit 104 are also contemplated, examples of which include a field programmable gate array, an application-specific integrated circuit, and so forth.

The memory management unit 106 is an electronic circuit configured to perform various memory management operations including, for example, virtual-to-physical address translation. In variations, the memory management unit 106 is an integrated component of the host processing unit 104, or the memory management unit 106 is a distinct physical entity that is separate from the host processing unit 104. In one example, the memory management unit 106 is configured for I/O device usage, e.g., as an input output memory management unit (IOMMU). Although a single instance of physical memory 108 is illustrated, the physical memory 108 is representative of a variety of types of physical memory that are implementable together, e.g., volatile and non-volatile memory.

As shown, the device 102 also includes one or more accelerator devices 114. An accelerator device 114 is a type of processor that is designed to execute a specific type of function with increased efficiency, as compared to the host processing unit 104. Examples of the accelerator devices 114 include, but are not limited to, graphics processing units, digital signal processors, network processors, storage controllers, and cryptographic accelerators. In general, the host processing unit 104 offloads computing tasks of a specific type to a respective accelerator device 114 that is designed to efficiently execute the specific type of task. The accelerator device 114 includes device memory 116 where data is stored (e.g., on chip) so that the stored data is accessible by the accelerator device 114 relatively faster than data that is stored in physical memory 108. In various examples, the device memory 116 includes one or more caches, e.g., a multi-cache hierarchy including L1, L2, and/or L3 caches.

In one or more implementations, the accelerator device 114 includes a device driver 118, which is a computer program that controls functionality of the accelerator device 114. In particular, the host processing unit 104 and the accelerator device 114 are communicatively coupled (e.g., via a bus) to enable communication between the operating system 110 and the device driver 118. For example, the operating system 110 invokes functionality of the device driver 118 by "calling" the device driver 118, and the device driver 118 issues commands to the accelerator device 114 to perform various processing operations. In some implementations, the device driver 118 returns processed data to the operating system 110.

The memory management unit 106, as configured, supports use of a virtual address space by the host processing unit 104 along with a physical address space of the physical memory 108. To do so, an address translation module 120 is employed to translate virtual memory addresses 122 received from the host processing unit 104 to physical memory addresses 124 of the physical memory 108, and vice versa. In order to support this translation, the address translation module 120 uses a plurality of architectural page tables, an example of which is the architectural page table 126. The architectural page table 126 is maintained in-memory 128 (e.g., as part of a translation lookaside buffer (TLB), as part of a memory array, registers, and so forth) to store a set of page table entries 130, also referred to as PTEs.

Broadly, a page table entry 130 points to a page of physical memory 108. The architectural page tables 126 are "architectural" in the sense that a format of the page table entries 130 is defined by computing architecture (e.g., an instruction set architecture (ISA)) that is utilized by the core hardware components of the device 102, e.g., the host processing unit 104 and the memory management unit 106. The computing architecture, for instance, defines how device hardware (e.g., the host processing unit 104 and the memory management unit 106) is controlled by system software, e.g., the operating system 110, hypervisors, etc.

More specifically, the format of the page table entries 130 define a particular set of attributes that are specifiable by one or more attribute bits 132 of the page table entries 130. The attribute bits 132, for instance, store information regarding the accessibility of a corresponding page of physical memory 108. By way of example and not limitation, the attribute bits 132 include bit(s) to specify whether a corresponding page of memory is read-only, bit(s) to specify whether a corresponding page of memory is non-cacheable, bit(s) to specify a write-back cache policy for a corresponding page of memory, bit(s) to specify a write-to cache policy for a corresponding page of memory, etc. Notably, the PTE format of the architectural page tables 126 is fixed, meaning that the attributes that are assigned to the attribute bits 132 are fixed and the page table entries 130 are not extendable to include additional attribute bits 132.

In a conventional separately maintained page table system, each of the accelerator devices 114 additionally include a memory management unit, an address translation module, and a set of page tables, e.g., per-accelerator page tables. Consider an example of this conventional technique in which an accelerator device 114 is accessing data of a particular virtual memory address. In this example, the address translation module of the accelerator device 114 performs virtual-to-physical address translation using the set of page tables of the respective accelerator device 114, and accesses the data from the physical memory address 124. Notably, different accelerator devices 114 have different page table formats, and the different page table formats include bits for extended attributes that are specific to respective accelerator devices 114. These extended attributes are different than the attributes that are expressible by the attribute bits 132 in the architectural page tables 126, and improve computational efficiency for the accelerator devices 114.

However, due to the different page table formats between the architectural page tables 126 and the per-accelerator page tables, each respective accelerator device 114 maintains a separate mapping of the virtual address space to the physical address space for data that the respective accelerator device 114 operates on. This means that when the operating system 110 issues commands to create or modify a mapping of a page table entry 130 to a page of physical memory 108 (e.g., via mapping operations, unmapping operations, invalidation operations, etc.), similar operations are performed at each of the accelerator devices 114 that include a mapping of the page. This results in inefficient consumption of communication bandwidth and increased memory management overhead because the mapping modification operation is duplicated n times for n accelerator devices 114 that include a mapping of the page. Moreover, the operating system 110 calls the device drivers 118 of respective accelerator devices 114 to carry out duplicated mapping operations. Accordingly, per-accelerator page tables are not implementable in security sensitive scenarios due to potentially malicious third-party driver code.

In a conventional shared page table system, address translation is performed by the address translation module 120 associated with the host processing unit 104. Consider an example of this conventional technique in which an accelerator device 114 is accessing data of a particular virtual memory address. In this example, the address translation module 120 translates the virtual memory address to a physical memory address, and returns the physical memory address to the accelerator device 114. Further, the accelerator device 114 accesses the data from the physical memory address. In accordance with this conventional technique, the memory management unit 106 maintains the sole mapping of the virtual address space to the physical address space. Given this, the mapping of the virtual address space is modifiable without duplicating mapping, unmapping, invalidation operations, and the like. In addition, the mapping of the virtual address space is modifiable without calling the device drivers 118. However, due to the fixed PTE format, conventional shared page table systems do not support extended attributes that are relevant to the accelerator devices 114, thereby failing to realize the accelerator performance benefits enabled by the extended attributes.

To solve these problems, the memory management unit 106 maintains two sets of shared page tables in-memory 128, namely the architectural page tables 126 and extendable page tables, an example of which is extendable page table 134. Page table entries 136 of the extendable page table 134 include extended attribute bits 138 for specifying accessibility and/or cacheability attributes relevant to the accelerator devices 114. By way of example, an extendable page table 134 is created for a virtual address space (e.g., a range of virtual memory addresses) that is allocated to a process. In this example, the extended attribute bits 138 of the extendable page table 134 include one or more default bits for specifying extended attributes relevant to all accelerator devices 114 of the device 102, e.g., MTYPE access statuses, such as uncached (UC), non-coherent (NC), non-coherent, non-volatile (NC_NV), cache coherent (CC), and so on. Moreover, the extended attribute bits 138 of the extendable page table 134 include one or more additional bits for specifying accessibility and/or cacheability attributes of a particular accelerator device 114 that is invoked by the process.

In accordance with the described techniques, the memory management unit 106 receives a virtual memory address 122 from the host processing unit 104. In response, the address translation module 120 leverages the architectural page table 126 to translate the virtual memory address 122 to a physical memory address 124. In addition, the address translation module 120 leverages the architectural page table 126 to retrieve the architecturally defined accessibility attributes from the attribute bits 132, e.g., read-only, non-cacheable, write-to, write-back, etc. Moreover, the address translation module 120 leverages the extendable page table 134 to retrieve extended attributes relevant to the accelerator devices 114 from the extended attribute bits 138. In this way, data is accessible from the physical memory address 124 (e.g., via the host processing unit 104 and/or the accelerator device 114) in accordance with the architecturally defined accessibility attributes and the extended attributes, including accessibility and/or cacheability attributes that are specific to an accelerator device 114 that operates on the data.

The described techniques retain the scalability benefits associated with standard shared page table systems. Indeed, in accordance with the described techniques, the memory management unit 106 maintains the sole mapping of the virtual address space to the physical address space. Given this, the mapping of the virtual address space is modifiable without calling potentially malicious device drivers 118 of the accelerator devices 114 to duplicate mapping operations, unmapping operations, invalidation operations, and the like. Accordingly, the described techniques improve computational efficiency over standard separately maintained page table systems by reducing communication bandwidth consumption and memory management overhead, and further enable use in security sensitive scenarios. Unlike standard shared page table systems, however, the extendable page table 134 enables retrieval of accessibility attributes specific to accelerator devices invoked by a process associated with the extendable page table 134. Accordingly, the described techniques enable increased computational efficiency for the accelerator devices 114 over standard shared page table systems.

Figure 2:
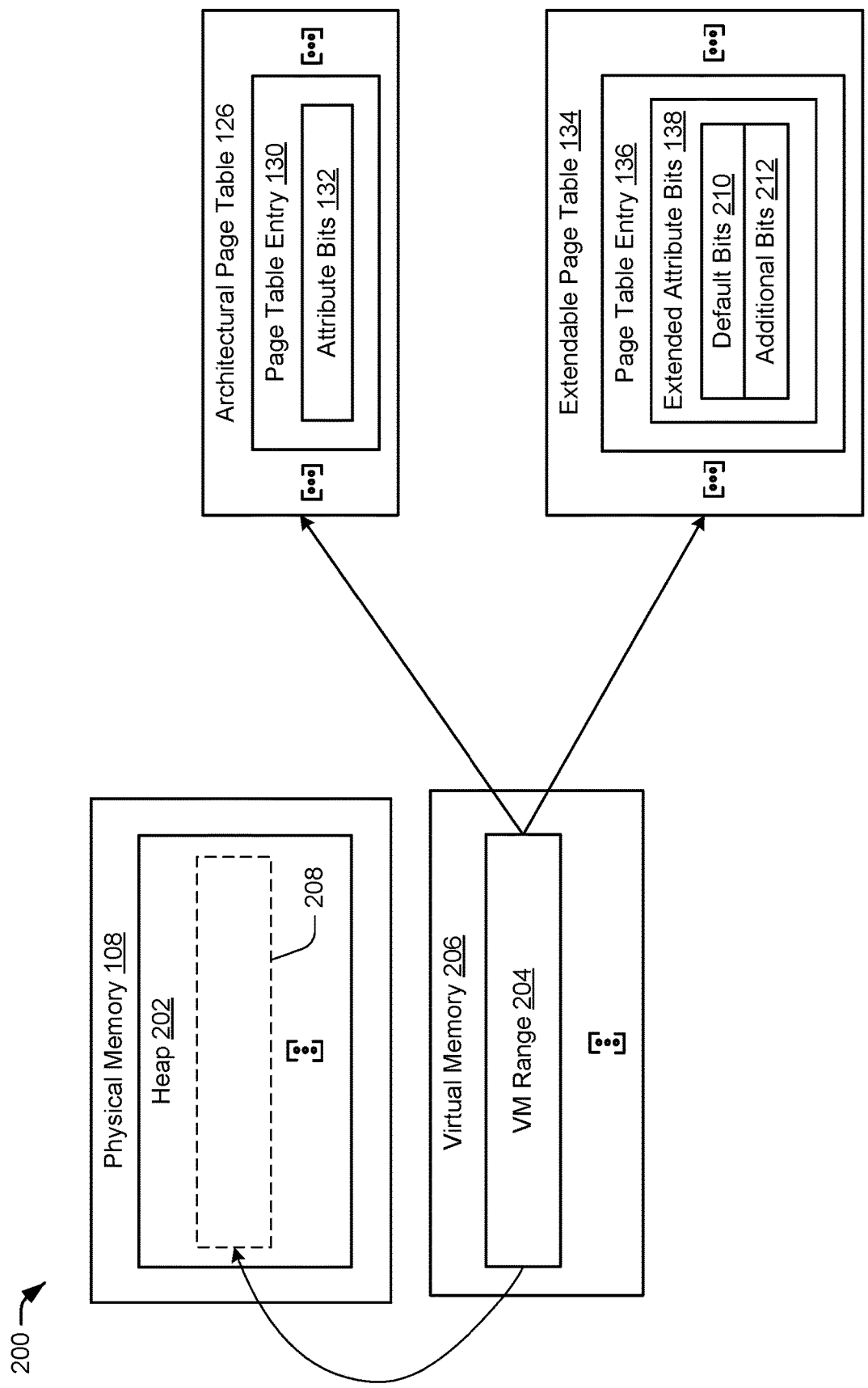
FIG. 2 depicts a non-limiting example in which an architectural page table and an extendable page table are created.

FIG. 2 depicts a non-limiting example 200 in which an architectural page table and an extendable page table are created. In accordance with the described techniques, the operating system 110 dynamically allocates a heap 202 of physical memory to a program 112, e.g., of an application. Additionally, the operating system 110 creates virtual address spaces for respective processes of the program 112. Given a process of the program 112, for instance, the operating system 110 maps a range 204 of addresses in virtual memory 206 to a portion 208 of physical memory 108 in the heap 202.

As part of this, the operating system 110 creates an architectural page table 126 for the process. The architectural page table 126 includes page table entries 130 which map virtual memory addresses in the range 204 to respective pages of physical memory 108 in the portion 208 of the heap 202. In addition, the operating system 110 populates the attribute bits 132 of the page table entries 130 with values indicating the particular set of attributes expressible by the architectural PTE format, e.g., whether a corresponding page of physical memory 108 is non-cacheable, read-only, write-back, write-to, and so on.

Furthermore, a runtime-based memory heap manager creates a set of extendable page tables 134 for the program 112, and further defines a default format for page table entries 136 of the extendable page tables 134 in the set. By way of example, the set of extendable page tables 134 includes an extendable page table 134 for each process of the program 112, and the default format is applicable to each of the extendable page tables 134 in the set. The default format, for instance, defines a size (e.g., a number of bits) for the page table entries 136 in the set of extendable page tables 134. In addition, the default format defines a number of default bits 210 that specify default attributes relevant to the accelerator devices 114 and make up a portion of the page table entries 136. The default bits 210, for instance, define one or more MTYPE access statuses relevant to accelerator devices 114, e.g., uncached (UC), non-coherent (NC), non-coherent, non-volatile (NC_NV), cache coherent (CC), and so on.

Therefore, a range 204 of virtual memory addresses is allocated to a process. Further, an architectural page table 126 is dedicated to the process which maps virtual memory addresses in the range 204 to physical memory addresses and to accessibility attributes expressible by the attribute bits 132. Further, a corresponding extendable page table 134 is dedicated to the process which maps virtual memory addresses in the range 204 to extended attributes expressible by the extended attribute bits 138.

In one or more implementations, user mode runtime code of the process modifies the default format for the extendable page table 134. For instance, the user mode runtime code extends the page table entries 136 to include additional bits 212. In various examples, the additional bits 212 are configured for specifying accessibility attributes and cacheability attributes associated with one or more accelerator devices 114 invoked by the process. Consider an example in which the extendable page table 134 is dedicated to a process that invokes a particular accelerator device 114. In this example, the user mode runtime code calls the device driver 118 of the particular accelerator device 114, and the device driver 118 extends the page table entries 136 in the extendable page table 134 to include the additional bits 212. Further, the device driver 118 assigns accessibility and/or cacheability attributes relevant to the particular accelerator device 114 to the additional bits 212. In variations, the user mode runtime code modifies the default format for the particular extendable page table 134 without calling the device driver 118.

The attributes expressible by the additional bits 212 are different than the accessibility attributes that are expressible by the attribute bits 132 of the architectural page table 126 and the default bits 210 of the extendable page table 134. In a specific but non-limiting example, the additional bits 212 specify whether data is cacheable (e.g., in device memory 116) by respective accelerator devices 114 invoked by the process. In an illustrative example, a first accelerator device 114 and a second accelerator device 114 are invoked by a process. In this example, a first additional bit 212 is configured for specifying whether data is cacheable in device memory 116 of the first accelerator device 114, and a second additional bit is configured for specifying whether data is cacheable in device memory 116 of the second accelerator device 114. This example is not to be construed as limiting, however, and it is to be appreciated that the additional bits 212 are assignable to any suitable attributes. In variations, the additional bits are assignable to accelerator-specific accessibility attributes, accelerator-specific cacheability attributes, non-accelerator related attributes (e.g., application-specific accessibility attributes), attributes relating to specific hardware within an accelerator device, data synchronization controls, and so on.

In one or more implementations, the user mode runtime code populates the default bits 210 and the additional bits 212 of respective page table entries 136 with values indicating the extended attributes for corresponding pages of physical memory 108. In this way, when a request to access data of a virtual memory address within the range 204 is received, the data is accessible: (1) from a physical memory address translated using the architectural page table 126, (2) based on foundational accessibility attributes retrieved from the attribute bits 132, and (3) based on extended attributes retrieved from the extended attribute bits 138, as further discussed below with reference to FIG. 3. Notably, the extended attribute bits 138 are not usable to override the architecturally defined accessibility attributes expressed by the attribute bits 132, or modify the mapping of the virtual address space to the physical address space.

Notably, the architectural page tables 126 are controlled by system software, e.g., by the operating system 110 and/or hypervisors. For instance, the system software (e.g., operating in kernel mode) creates and/or modifies the mapping of virtual address space to physical address space, as reflected in the architectural page tables 126. In addition, the system software (e.g., operating in kernel mode) populates the attribute bits 132 to specify the foundational accessibility attributes. In contrast, the extendable page tables 134 are controlled by user mode runtime code. Indeed, user mode runtime code (e.g., and/or code of a called device driver 118) extends the default format to include the additional bits 212, and populates the extended attribute bits 138 to specify accelerator-specific accessibility and/or cacheability attributes.

In one or more implementations, the set of extendable page tables 134 associated with the program 112 include multiple extendable page tables 134 having additional bits 212 that specify different attributes. Consider an example in which a first process of the program 112 invokes a first accelerator device 114, and a second process of the program 112 invokes a second accelerator device 114. In accordance with this example, a first extendable page table 134 is dedicated to the first process, and a second extendable page table 134 is dedicated to the second process. Further, the page table entries 136 of the first extendable page table 134 and the second extendable page table 134 both include the default bits 210 configured for specifying the same set of default extended attributes. However, the additional bits 212 of the first extendable page table 134 include a bit for specifying an accessibility and/or cacheability attribute specific to the first accelerator device 114 invoked by the first process. In contrast, the additional bits 212 of the second extendable page table 134 include a bit for specifying a different accessibility and/or cacheability attribute specific to the second accelerator device 114 invoked by the second process.

Figure 3:
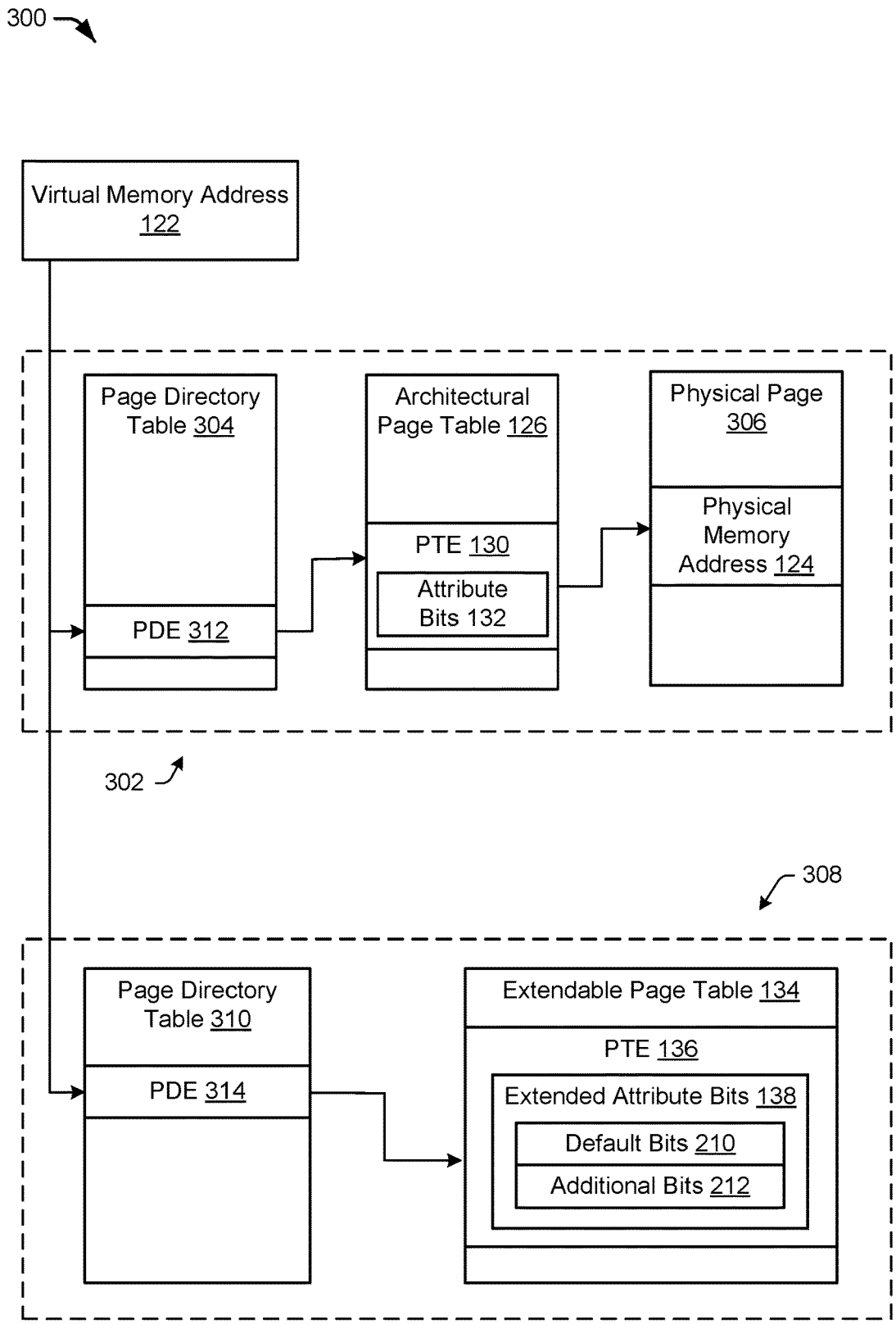
FIG. 3 depicts a non-limiting example of virtual-to-physical address translation and attribute retrieval using multi-level page table hierarchies.

FIG. 3 depicts a non-limiting example 300 of virtual-to-physical address translation and attribute retrieval using multi-level page table hierarchies. As shown, a first multi-level page table hierarchy 302 includes a first level having a page directory table 304, a second level having the architectural page table 126, and a third level having a physical page 306. Further, a second multi-level page table hierarchy 308 includes a first level having a page directory table 310, and a second level having the extendable page table 134. However, it is to be appreciated that the first multi-level page table hierarchy 302 and the second multi-level page table hierarchy 308 include additional levels in variations, e.g., a level having page map level 4 tables, a level having page-directory pointer tables, etc. In one or more implementations, the virtual memory address 122 is configured using offsets to locate entries in corresponding tables of the first and second multi-level page table hierarchies 302, 308.

By way of example, the virtual memory address 122 includes a page directory offset which identifies a page directory entry 312 in the page directory table 304 of the first multi-level page table hierarchy 302. Further, the page directory entry 312 identifies the architectural page table 126, e.g., from among a plurality of architectural page tables 126. In addition, the virtual memory address 122 includes a page table offset which identifies a page table entry 130 within the architectural page table 126. The address translation module 120 is configured to retrieve the particular set of attributes expressible by the architectural PTE format from the attribute bits 132 of the page table entry 130. The page table entry 130 identifies the physical page 306, e.g., from among a plurality of physical pages 306. Moreover, the virtual memory address 122 includes a physical page offset which identifies a physical memory address 124 within the physical page 306.

In addition, the page directory offset of the virtual memory address 122 identifies a page directory entry 314 in the page directory table 310 of the second multi-level page table hierarchy 308. Further, the page directory entry 314 identifies the extendable page table 134, e.g., from among a plurality of extendable page tables 134. In addition, the page table offset of the virtual memory address 122 identifies a page table entry 136 within the extendable page table 134. The address translation module 120 is configured to retrieve extended attributes from the extended attribute bits 138, e.g., from the default bits 210 and the additional bits 212.

In this way, data is accessible from the physical memory address 124 in accordance with the particular set of attributes expressed by the attribute bits 132 of the architectural page table 126, and the extended attributes expressed by the extended attribute bits 138 of the extendable page table 134. In a specific but non-limiting example, the host processing unit 104 requests to access data of the virtual memory address 122. In this example, the attribute bits 132 specify a write-back policy for the physical page 306, the default bits 210 specify a cache coherent (CC) access status for the physical page 306, and an additional bit 212 specifies that the physical page 306 is not cacheable to device memory 116 of a particular accelerator device 114. Based on the cache coherent status (CC), the host processing unit 104 accesses the data from the physical memory address 124 without commands being issued to ensure cache coherence among accelerator devices 114 that maintain stale data. Based on the additional bit 212, the host processing unit 104 accesses the data without writing the data to a cache maintained by the particular accelerator device 114. Further, based on the write-back policy, the host processing unit 104 writes any modified and/or processed data back to physical memory 108.

Notably, when the operating system 110 performs page migration and/or demand paging (e.g., moving memory pages between physical memory subsystems and/or between volatile and non-volatile memory), the operating system 110 is configured to modify the architectural page table 126 to include updated physical addresses and/or an indication of page fault for the moved memory page. However, the extendable page table 134 is solely referenced via the virtual address space. This means that, after the operating system 110 performs demand paging and/or page migration on a memory page, the extended attributes of the page table entry 136 associated with the memory page are properly reapplied without modifications being made to the extendable page table 134.

Figure 4:
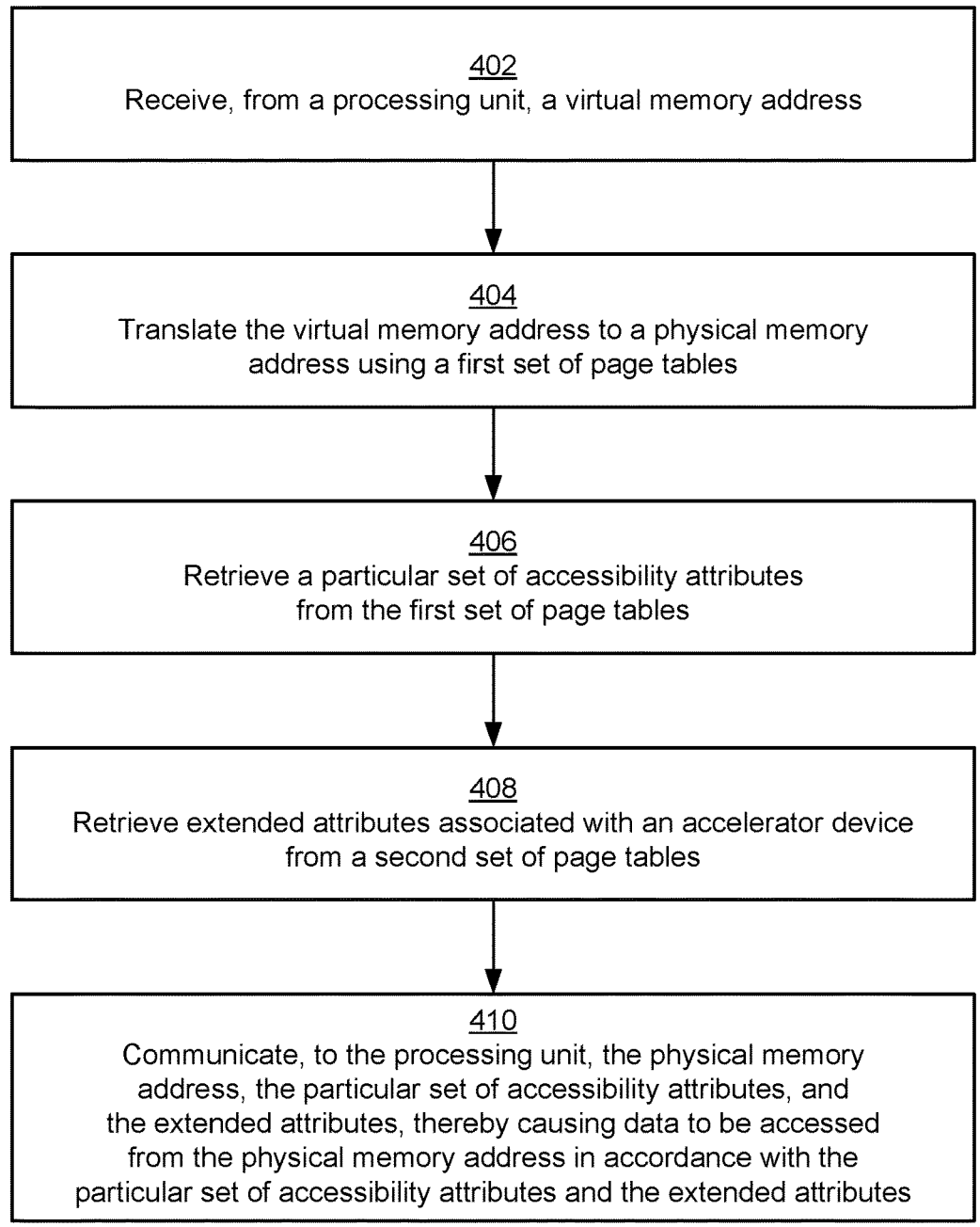
FIG. 4 depicts a procedure in an example implementation of extended attributes for shared page tables.

FIG. 4 depicts a procedure 400 in an example implementation of extended attributes for shared page tables. A virtual memory address is received from a processing unit (block 402). For example, the memory management unit 106 receives a virtual memory address 122 from the host processing unit 104, e.g., as part of a request to access data associated with the virtual memory address 122. The virtual memory address is translated to a physical memory address using a first set of page tables (block 404). By way of example, the address translation module 120 walks the first multi-level page table hierarchy 302 to translate the virtual memory address 122 into the physical memory address 124.

A particular set of accessibility attributes is retrieved from the first set of page tables (block 406). As part of walking the first multi-level page table hierarchy 302, the address translation module 120 identifies a page table entry 130 in an architectural page table 126 corresponding to the virtual memory address 122. Further, the address translation module 120 retrieves a particular set of accessibility attributes from the attribute bits 132 of the page table entry 130. Since a format of the page table entries 130 in the architectural page tables 126 is architecturally defined, the accessibility attributes assigned to the attribute bits 132 are fixed. By way of example, the accessibility attributes assigned to the attribute bits 132 is consistent across different architectural page tables 126.

Extended attributes associated with an accelerator device are retrieved from a second set of page tables (block 408). For example, the address translation module 120 walks the second multi-level page table hierarchy 308 to identify a page table entry 136 in an extendable page table 134 corresponding to the virtual memory address 122. Further, the address translation module 120 retrieves extended attributes relevant to accelerator devices 114 from the extended attribute bits 138 of the page table entry 136.

In contrast to the architectural page table 126, the extendable page table 134 is modifiable. Indeed, a default format is defined for the extendable page table 134, including default bits 210 for specifying default accessibility attributes relevant to accelerator devices 114. Further, user mode runtime code (e.g., of an application) modifies the default format by extending page table entries 136 in the extendable page table 134 to include additional bits 212. By way of example, the extendable page table 134 is dedicated to a process, and the additional bits are configured to specify accessibility attributes associated with a specific accelerator device 114 invoked by the process. In accordance with the described techniques, the address translation module retrieves the extended attributes from the default bits 210 and the additional bits 212 of the page table entry 136. Notably, the number of bits in the extended attribute bits 138 and the accessibility attributes assigned to the extended attribute bits 138 are different across different extendable page tables 134.

The physical memory address, the particular set of accessibility attributes, and the extended attributes are communicated to the processing unit, thereby causing data to be accessed from the physical memory address in accordance with the particular set of accessibility attributes and the extended attributes (block 410). By way of example, the memory management unit 106 communicates the physical memory address 124, the particular set of accessibility attributes, and the extended attributes to the host processing unit 104. In this way, a requesting device (e.g., the host processing unit 104 and/or the accelerator device(s) 114) accesses data from the physical memory address in accordance with the particular set of accessibility attributes (as retrieved from the architectural page table 126) and the extended attributes (as retrieved from the extendable page table 134).

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the host processing unit 104, the memory management unit 106, the physical memory 108, and the accelerator devices 114) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A device, comprising:
   an accelerator device; and
   memory management circuitry to:
   maintain a first page table and a second page table allocated to a process that invokes the accelerator device, the second page table including one or more extended attributes specific to the accelerator device, the one or more extended attributes differing from one or more additional extended attributes of a third page table allocated to an additional process that invokes an additional accelerator device;
   receive a virtual memory address;
   retrieve, from the first page table, a physical memory address corresponding to the virtual memory address; and
   retrieve, from the second page table, the one or more extended attributes, wherein data is accessed from the physical memory address based on the one or more extended attributes.

2. The device of claim 1, wherein a format of the first page table is defined by a computing architecture of the device, the format defining a particular set of accessibility attributes that are specified by attribute bits of page table entries in the first page table.

3. The device of claim 2, wherein the memory management circuitry is configured to retrieve, from the attribute bits of a page table entry associated with the virtual memory address in the first page table, the particular set of accessibility attributes.

4. The device of claim 3, wherein the data is accessed from the physical memory address based on the particular set of accessibility attributes and the one or more extended attributes.

5. The device of claim 1, wherein the second page table is included as part of a set of page tables associated with a program, and a default format is defined for the set of page tables.

6. The device of claim 5, wherein the default format includes default bits for page table entries of the set of page tables, the default bits specifying default accessibility attributes relevant to accelerator devices.

7. The device of claim 6, wherein a range of virtual memory addresses is allocated to the process of the program.

8. The device of claim 7, wherein the page table entries of the second page table are extended to include additional bits based on the accelerator device being invoked by the process, the additional bits specifying the one or more extended attributes specific to the accelerator device.

9. The device of claim 8, wherein the memory management circuitry is configured to retrieve the default accessibility attributes from the default bits and the one or more extended attributes from the additional bits of a page table entry associated with the virtual memory address in the second page table based on the virtual memory address being within the range.

10. The device of claim 1, wherein the second page table is identified by a first range of virtual memory addresses allocated to the process of a program, and the third page table is identified by a second range of virtual memory addresses allocated to the additional process of the program.

11. The device of claim 1, wherein the first page table includes a mapping of the virtual memory address to the physical memory address, and the mapping is modifiable without a device driver of the accelerator device being called.

12. The device of claim 1, wherein the process invokes the accelerator device and a further accelerator device, and the one or more extended attributes of the second page table include a first attribute specific to the accelerator device and a second attribute specific to the further accelerator device.

13. An apparatus, comprising:
    a first accelerator device;
    a second accelerator device; and
    memory management circuitry to:
    maintain a first page table and a second page table associated with a process of a program that invokes the first accelerator device and the second accelerator device, the second page table including a first accessibility attribute specific to the first accelerator device and a second accessibility attribute specific to the second accelerator device;
    receive a virtual memory address;
    translate the virtual memory address to a physical memory address using the first page table; and
    retrieve the first and second accessibility attributes from the second page table, wherein data is accessed from the physical memory address based on the first and second accessibility attributes.

14. The apparatus of claim 13, wherein the memory management circuitry is configured to retrieve, from the first page table, one or more additional accessibility attributes.

15. The apparatus of claim 14, wherein the first page table is formatted for specifying a predefined set of accessibility attributes, and the second page table is flexibly formatted for specifying a modifiable set of accessibility attributes.

16. A method, comprising:
receiving, from a processor, a virtual memory address;
translating the virtual memory address to a physical memory address using a first page table;
retrieving one or more attributes that are specific to an accelerator device from a page table entry of a second page table allocated to a process that invokes the accelerator device, the page table entry having a default format including default bits for specifying default accessibility attributes relevant to accelerator devices; and
communicating, to the processor, the physical memory address and the one or more attributes, thereby causing the processor to access data from the physical memory address based on the one or more attributes.

17. The method of claim 16, wherein the page table entry is extended from the default format to include additional bits for specifying one or more extended attributes.

18. The method of claim 17, wherein retrieving the one or more attributes includes retrieving the default accessibility attributes from the default bits, and retrieving the one or more extended attributes from the additional bits.

19. The method of claim 16, wherein a virtual memory address range is allocated to the process of a program, the first page table including a mapping of the virtual memory address range to physical memory addresses.

20. The method of claim 19, wherein the second page table includes an additional mapping of the virtual memory address range to the one or more attributes, the mapping being modifiable without a device driver of the accelerator device being called.

* * * * *